United States Patent
Katayama et al.

(10) Patent No.: US 6,351,787 B2
(45) Date of Patent: Feb. 26, 2002

(54) FILE MEMORY DEVICE AND INFORMATION PROCESSING APPARATUS USING THE SAME

(75) Inventors: Kunihiro Katayama, Yokohama; Kenichi Kaki, Zama; Jun Kitahara; Tsunehiro Tobita, both of Yokohama; Kazunori Furusawa, Kodaira, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/793,967

(22) Filed: Feb. 28, 2001

Related U.S. Application Data

(63) Continuation of application No. 09/207,749, filed on Mar. 9, 1994, now Pat. No. 6,272,610.

(30) Foreign Application Priority Data

Mar. 11, 1993 (JP) ................................. 5-051041

(51) Int. Cl.⁷ .......................... G06F 12/00; G11C 16/00
(52) U.S. Cl. ........................ 711/103; 711/5; 711/170; 365/189.01
(58) Field of Search .................... 711/5, 103, 154, 711/170, 171; 365/189.01, 218, 220

(56) References Cited

U.S. PATENT DOCUMENTS

| | | | |
|---|---|---|---|
| 3,753,235 A | 8/1973 | Daughton et al. | 365/200 |
| 4,051,354 A | 9/1977 | Choate | 371/10.3 |
| 4,162,536 A * | 7/1979 | Morley | 714/18 |
| 4,310,248 A | 1/1982 | Mededith | 356/243 |
| 4,483,001 A | 11/1984 | Ryan | 371/2.2 |
| 4,648,064 A * | 3/1987 | Morley | 710/45 |
| 4,860,048 A | 8/1989 | Itoh et al. | 355/326 R |
| 4,903,239 A | 2/1990 | Akashi | 365/189.01 |
| 4,961,094 A | 10/1990 | Yamaoki et al. | 355/326 R |
| 5,030,996 A | 7/1991 | Tajima et al. | 355/326 |
| 5,066,979 A | 11/1991 | Goto et al. | 355/326 |
| 5,167,024 A * | 11/1992 | Smith et al. | 713/322 |
| 5,212,666 A | 5/1993 | Takeda | 365/230.03 |
| 5,260,752 A | 11/1993 | Fuma et al. | 355/326 |
| 5,263,003 A | 11/1993 | Cowles et al. | 365/230.03 |
| 5,365,325 A | 11/1994 | Kumasaka et al. | 355/326 |
| 5,406,313 A | 4/1995 | Noami et al. | 355/327 |
| 5,487,133 A * | 1/1996 | Park et al. | 706/20 |
| 5,812,756 A * | 9/1998 | Taylor | 714/30 |
| 5,828,862 A * | 10/1998 | Singkornrat et al. | 711/115 |

FOREIGN PATENT DOCUMENTS

| | | |
|---|---|---|
| JP | 5488242 | 6/1979 |
| JP | 61245255 | 10/1986 |
| JP | 62217496 | 9/1987 |
| JP | 2292798 | 12/1990 |

\* cited by examiner

Primary Examiner—Tuan V. Thai
(74) Attorney, Agent, or Firm—Antonelli, Terry, Stout & Kraus, LLP

(57) ABSTRACT

A semiconductor file memory device, and an information processing system incorporating the device, uses flash memories to achieve fast file access performance. The file memory device includes a parallel arrangement of memory element groups having a unit erasure block size greater than the data bus width of the memory device, and a data access width smaller than the data bus; a file division unit for dividing file data having one or more unit storage data blocks into combined blocks that include a combination of arbitrary unit storage data blocks; a data distribution unit for arbitrarily combining data on the data bus having a unit data size equal to the data access width, and for making the combined data correspond to an arbitrary combination of memory element groups equal in number to the unit size data; and a control unit for controlling the data distribution unit so that each combined block is stored in the file memory device based on a correspondence between the combined block and arbitrary combinations of memory elements.

15 Claims, 13 Drawing Sheets

| SYSTEM DATA BUS WIDTH | MEMORY DATA BITS / HARDWARE | 4 bit | 8 bit | 16 bit | 32 bit |
|---|---|---|---|---|---|
| 8 bit | DATA DISTRIBUTION CIRCUIT | 4 bit×2 | 8 bit×1 | 8 bit×2 | 8 bit×4 |
| | NUMBER OF LATCHES | 2 | 1 | 2 | 4 |
| | NUMBER OF MEMORY GROUPS | 2 | 1 | 1 | 1 |
| 16 bit | DATA DISTRIBUTION CIRCUIT | 4 bit×4 | 8 bit×2 | 16 bit×1 | 16 bit×2 |
| | NUMBER OF LATCHES | 4 | 2 | 1 | 2 |
| | NUMBER OF MEMORY GROUPS | 4 | 2 | 1 | 1 |
| 32 bit | DATA DISTRIBUTION CIRCUIT | 4 bit×8 | 8 bit×4 | 16 bit×2 | 32 bit×1 |
| | NUMBER OF LATCHES | 8 | 4 | 2 | 1 |
| | NUMBER OF MEMORY GROUPS | 8 | 4 | 2 | 1 |
| 64 bit | DATA DISTRIBUTION CIRCUIT | 4 bit×16 | 8 bit×8 | 16 bit×4 | 32 bit×2 |
| | NUMBER OF LATCHES | 16 | 8 | 4 | 2 |
| | NUMBER OF MEMORY GROUPS | 16 | 8 | 4 | 2 |
| 128 bit | DATA DISTRIBUTION CIRCUIT | 4 bit×32 | 8 bit×16 | 16 bit×8 | 32 bit×4 |
| | NUMBER OF LATCHES | 32 | 16 | 8 | 4 |
| | NUMBER OF MEMORY GROUPS | 32 | 16 | 8 | 4 |

FILE MEMORY DEVICE AND INFORMATION PROCESSING APPARATUS USING THE SAME

This is a continuation of application Ser. No. 08/207,749, filed Mar. 9, 1994 is now U.S. Pat. No. 6,272,610.

BACKGROUND OF THE INVENTION

1. Field of the Invention

This invention relates to an information processing apparatus incorporating a file memory device, and particularly to a file memory device suitable for the speed-up of file access and to an information processing apparatus using it.

2. Description of the Related Art

The file memory is an almost indispensable peripheral device for general-purpose information processing systems such as personal computers. Generally, file memories are built into the main unit of the information processing system, thereby allowing the user to deal with capacious files.

Recently, notebook and palm-type personal computers have gained popularity, their appeal lying principally on their usefulness in terms of portability. Accordingly, file-memory-based semiconductor memory chips have been used in place of magnetic-type disk memory because the latter is not ideally suited to a notebook computer environment, i.e. They are not reliable against vibrations and consume too much power. An example of a system which employs a semiconductor file memory based on a flash memory is disclosed in Japanese patent publication JP-A-2-292798.

A flash memory is an electrically erasable and programmable non-volatile memory. Because they can be manufactured at comparatively low cost in large-scale production, flash memories have proven to be one of the most effective storage mediums for use as a semiconductor file memory. The technique of the above-mentioned patent publication is intended to solve many of the problems that are encountered in designing a file memory based on the flash memory, specifically, the cited patent publication recognizes that frequent erasing operations in a file memory causes damage to many of its file memory elements. The cited patent proposes a method of alleviating this drawback of the file memory, and in addition proposes a method of speeding up erasing operations required for rewriting data therein. The semiconductor file memory further achieves compatibility with the magnetic disk memory with respect to the way in which it interfaces with main information processing apparatus; with the principal intention of reorganizing information processing systems by replacing their magnetic disk memories with semiconductor memories.

The above-mentioned prior art semiconductor file memory achieves compatibility with magnetic disk memories by using the existing interface bus of the main information processing apparatus. Although this design principle allows the user to easily accept the semiconductor memory, because of it compatibility with the magnetic disk memory, it does not take advantage of the superiority which the semiconductor memory has over magnetic disk memories. For example, a semiconductor memory in the form of a static storage medium enables very fast data access. The magnetic disk memory, in contrast, reads or writes data at certain positions on a turning disk. This fast access property of the semiconductor memory, however, cannot be utilized with the interface that is designed for the magnetic disk memory.

Magnetic disk memories used in presently existing information processing apparatuses such as personal computers are slow in data access relative to the main memory access. Therefore, the magnetic disk memory does not need to operate in synchronism with the CPU of processing apparatus, and it transacts data over an asynchronous data bus. In contrast, semiconductor memories are fast enough to operate in synchronism the CPU. The ability of a file memory to operate synchronously with a CPU becomes significant.

However, if it is intended to overcome the difference of the data bus width of a flash memory chip from the CPU data bus width by using memory chips in parallel, a new problem arises. Namely, a flash memory has a fixed size of unit erasure block area, which is typically 512 bytes. Accordingly, when multiple memory chips are used in parallel, an area equal to the unit block area (e.g., 512 bytes) multiplied by the number of chips in parallel in erased at once.

Many personal computers have a unit storage data block for file management (i.e., a sector having a size) of 512 bytes. Thus, for example, if it is intended to use four flash memory chips in parallel, a rewrite access to one file sector will result in the erasure of an area that is four times the sector. This unit erasure block size is too large, and unintentional erasure of other data can occur.

SUMMARY OF THE INVENTION

A first object of the present invention is to provide a semiconductor file memory device that can access file data faster than prior art semiconductor file memory devices, and which is inexpensive when used in an information processing apparatus.

It is another-object of the present invention to provide a method controlling the semiconductor file memory device, as mentioned above.

Another object of the present invention is to provide a semiconductor file memory device of the aforementioned type that is based on a flash memory having a relatively large unit erasure block size which does not affect file data located in other portions of the memory, and to provide a method for controlling such a memory device.

A further object of this invention is to provide a semiconductor file memory device which is compact in size.

A further object of this invention is to provide a file memory device that effectively uses fragmentary memory areas, which are created during the process of storing multiple files of various sizes by varying the file storage method dynamically.

The semiconductor file memory device of the present invention uses a parallel arrangement of memory element groups which has, one, a unit erasure block size greater than the data bus width of the file memory device and, two, a data access width smaller than the data bus width of the file memory device. The file memory, which operates to store file data through the data bus, comprises: a file division means for dividing file data, that includes one or more unit storage data blocks into combined blocks which include a combination of arbitrary unit storage data blocks; a data distribution means for combining arbitrarily data from the data bus into a unit data size equal to a predetermined data access width, and for making the combined data correspond to an arbitrary combination of memory element groups equal in number to the unit size data; and a control means for controlling the data distribution means so that each combined block is stored in a corresponding one of the arbitrary combinations of memory element groups.

The information processing system of the present invention is equipped with a built-in semiconductor file memory device in the form of a storage medium, such as a flash memory, having a large unit erasure block size, which memory can therefore realize a level of fast file access performance that is superior compared to magnetic disk-type memories. Advantageously, the CPU operation of the information processing system of the present invention can be timed to operate synchronously with the file memory device by manipulating a Ready signal to be input into the CPU so that it is halted properly. Also, in this system fast file access is possible even if a flash memory chip has a number of access data bits different from the system data bus width.

The file memory device of the present invention advantageously can be used to provide continuous sector access in reading or writing a capacious file in which the file access time is crucial for the user.

In addition, the file memory device has a flexible system design in terms of both system data bus width and the number of access data bits of flash memory chips that vary depending on system application, performance, and technical trends of time. The invention also is capable of speeding up the memory based on an interleave access scheme.

The method of the present invention for controlling the file memory simplifies the access procedure of the system, which in turn increases the speed of the fast file access function and simplifies the overall file management system itself as well as the control circuit and the control program.

Through the provision of the data distribution function within the memory element, the peripheral circuitry can be reduced and the data processing speed can be increased.

According to the above-mentioned principle of this invention, it becomes possible for the flash memory based file memory device to prevent the unintentional erasure of other file data during a file revising operation and to store file data in a reduced time through the multiple-byte concurrent write operation while utilizing memory areas effectively.

BRIEF DESCRIPTION OF THE DRAWINGS

FIG. 12 is a diagram used to explain the data distribution of one memory chip access based on an embodiment of this embodiment;

FIG. 15 is a table explaining the hardware arrangement for various combinations of system data buses and memory data buses.

DESCRIPTION OF THE PREFERRED EMBODIMENTS

The principle of this invention will be explained with reference to the drawings on assumption that the information processing apparatus is a personal computer and the semiconductor storage medium is a flash memory.

In order to prevent the unintentional erasure of other file data, which is the prior art problem as mentioned previously, it is necessary for a CPU having a 32-bit data bus with an associated flash memory having a 8-bit data bus, for example, to make access to a flash memory chip four times cyclically. In the case of a continuous access to four sectors or more, it is possible for the CPU to have a concurrent access to four flash memory chips to get data of these sectors on its 32-bit data bus.

For the expedience of file management, data that is once treated as data of continuous sectors will never be divided afterward. Namely, a file system is solely accessed in units of file. Accordingly, in the case of a continuous access to multiple sectors, multiple memory chips are accessed at once for writing file data in parallel in these sectors, and thereafter the same file data can be read out by making a parallel access to the memory chips in the same manner.

Figure 10:
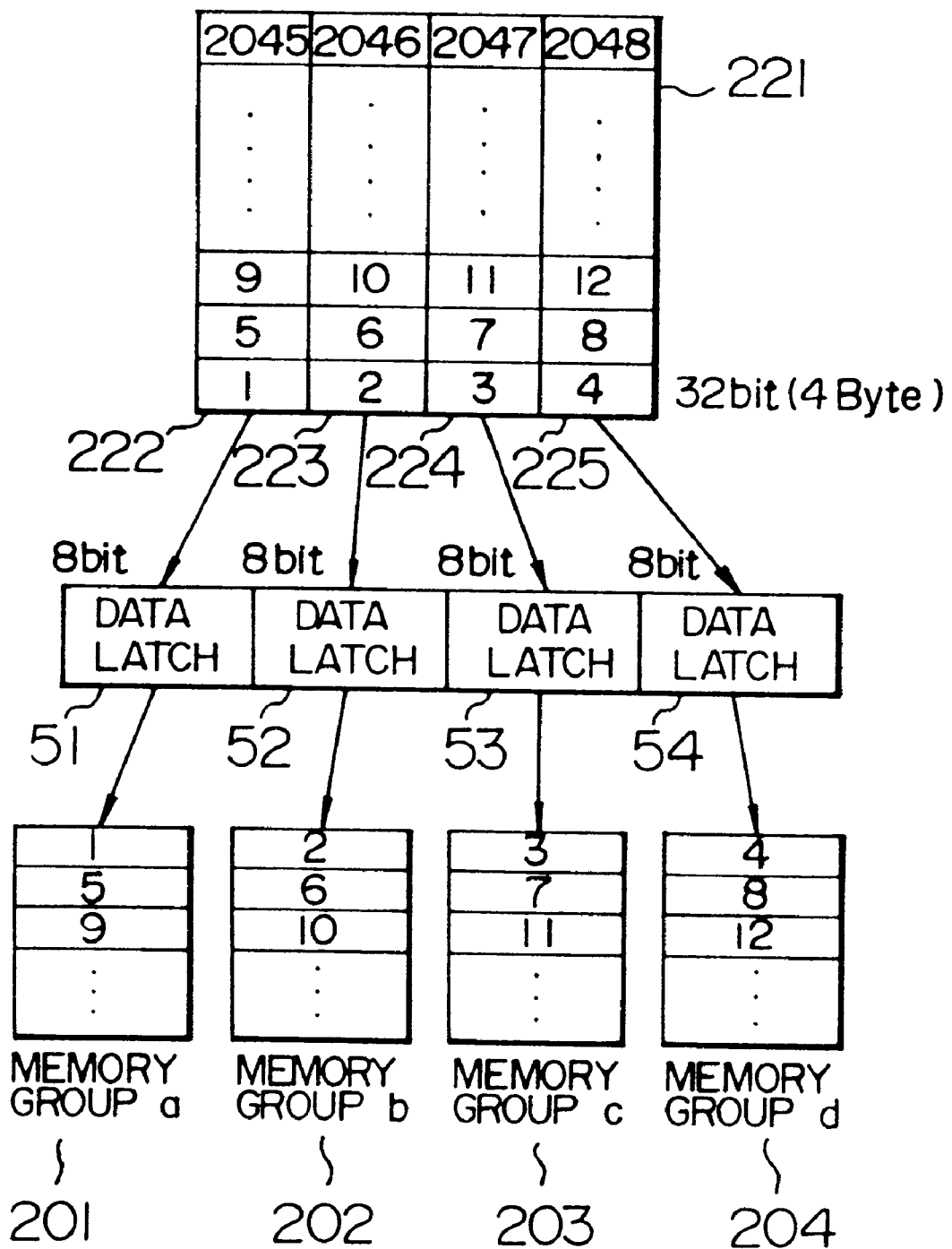
FIG. 10 is a diagram used to explain the 4-byte concurrent write operation based on an embodiment of this embodiment.
Figure 11:
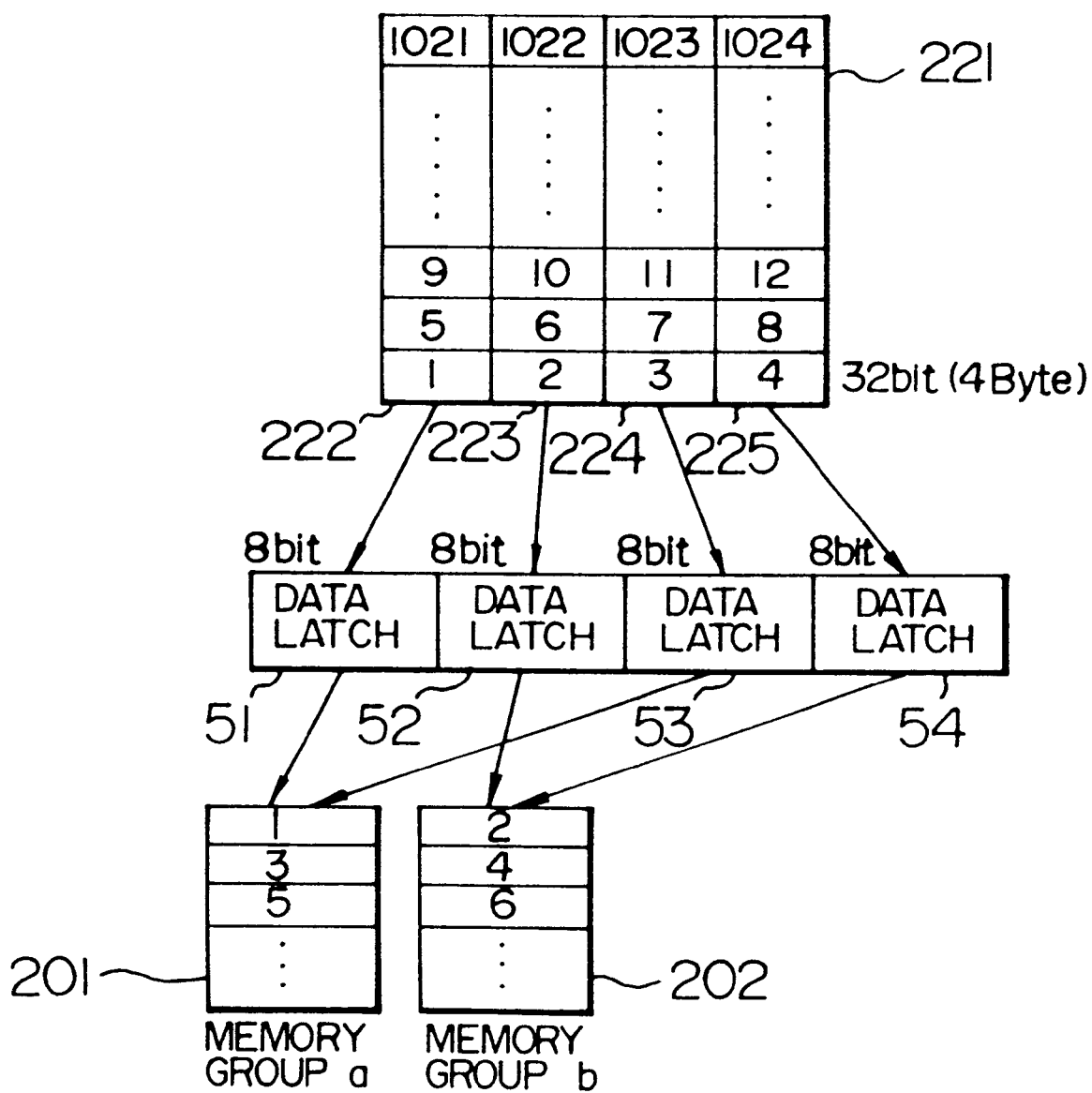
FIG. 11 is a diagram used to explain the 2-byte concurrent write operation based on an embodiment of this embodiment.

The distributive storing operation for two sectors and four sectors will be explained with reference to FIG. 10 showing an example of 4-byte concurrent writing and FIG. 11 showing an example of 2-byte concurrent writing. The system has a 32-bit data bus and each memory group has a 8-bit data access width in these examples.

FIG. 10 shows the case of 4-sector concurrent writing to four memory chips (will be termed "memory groups") a, b, c and d. Indicated by 221 are 32-bit (4-byte) data coming over the system bus, and 222–225 are serial numbers of 8-bit (1-byte) data, of which 222, 223, 224 and 225 are first, second, third and fourth byte data, respectively. Data of the first through 2048th bytes of four sectors are sent continuously in such a manner that the first through fourth bytes are received at once at the beginning through the 32-bit bus. Indicated by 51–54 are data latches for holding the received data temporarily.

After 32-bit (4-byte) data has been held in the data latches 51–54 concurrently, individual byte data are written by being distributed in the four memory groups a through d. Subsequently, the next 32-bit data is written additionally in the memory groups a through d. In this manner, the first through 512th bytes of the first sector are written in the memory groups in 128 write operations. The next 512-byte data of the second sector are written additionally in the memory, four bytes at a time. Similarly, the next 512-byte data for the third sector and further 512-byte data of the fourth sector are written successively.

At this time point, a unit erasure block of the four memory chips is filled with data of up to 2048th byte. Accordingly, this 4-sector memory area can be erased at once without problem for the revision of the file. Data of each sector are written by being distributed in the memory groups a through d, instead of being stored in one particular memory group, as explained above.

The concurrent 4-chip parallel access operation for four sectors of file at a time is repeated, and residual data less than four sectors at the end of write operation or data of a small file less than four sectors are treated as follows. For writing data of three sectors, the data are treated as 2-sector data plus 1-sector data, since 32 bits of CPU bus is not a multiple of 3.

The write operation of 2-sector data based on 2-byte concurrent writing to the memory groups a and b will be explained as an example with reference to FIG. 11. After the 32-bit (4-byte) data has been held in the data latches 51–54 concurrently, the latched data is divided into two parts, and the first 2-byte data is written in the memory groups a and b and subsequently the second 2-byte data is written additionally in the memory groups a and b. In this manner, 512-byte data of the first sector are written in the memory groups a and b in 256 write operations, and subsequently 512-byte data of the second sector are written additionally in the memory groups a and b in 256 write operations.

In the case of the write operation of one sector (not shown), 32-bit data from the CPU is divided into four parts and one 8-bit part is written in one memory chip at a time. Accordingly, 512 bytes of one sector are stored in a 1-sector area of one memory chip in 512 write operations.

Through the selective implementation of a flash memory access mode depending on the number of sectors to be accessed continuously, the file access speed can be enhanced. Through the selective implementation of a data storing mode, the problem of unintentional erasure of other flash memory areas can be overcome, i.e., it is guaranteed that a unit erasure block of a memory chip stores only data of a same file in all data storing modes.

Although this invention is intended to operate the flash memory in synchronism with the CPU, the memory operation takes a longer time in some access modes. The inventive file memory device copes with this problem by issuing a wait request appropriately to the Ready signal input of the CPU. Prevailing CPU devices are mostly provided with the Ready signal input terminal, e.g., all CPU devices of the type of 16 bits or more manufactured by INTEL CORPORATION, which are adopted dominantly in recent general-purpose personal computers, have this terminal.

The Ready signal is simply negated so that the CPU halts unless data reading or writing completes in the data access cycle, and by restoring the Ready signal on completion of data access, the CPU resumes the processing. Since this control is only feasible when the file memory and CPU operate synchronously, it is indispensable to apply synchronous clocks to both devices. Based on this control, it becomes possible to deal with cases of CPUs and flash memories having different data widths of one process cycle by putting the CPU in the wait state until both data widths meet.

Next, an embodiment of this invention will be explained in detail.

Figure 1:
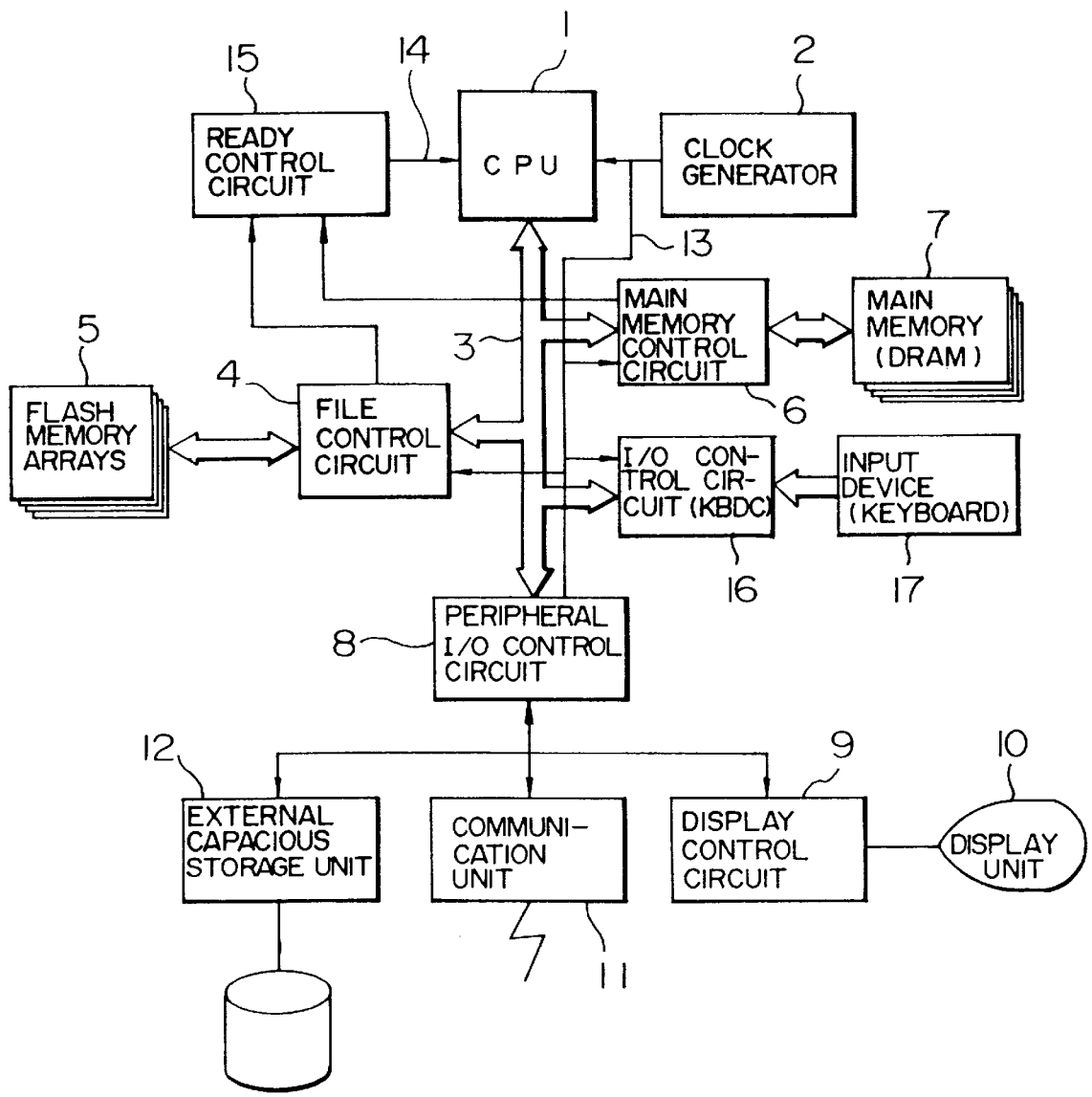
FIG. 1 is a block diagram showing the arrangement of the information processing apparatus based on this invention.

FIG. 1 shows the arrangement of a typical personal computer which is equipped with the flash memory based file memory device of this invention. In the figure, reference numeral 1 denotes a CPU which controls the implementation of programs and has a 32-bit data bus, and 2 is a clock generator for generating a system clock signal. 3 is a set of internal common signal buses including a data bus, address bus, memory command lines and I/O command lines, and these are generically called "system bus". 4 is a file control circuit which implements the file management and memory control for the file memory device. 5 is a set of flash memory arrays that is the storage medium of the file memory device, with each memory chip having eight access data bits. The file control circuit 4 and flash memory arrays 5 in unison constitute the flash memory based file memory device. 6 is a main memory control circuit, and 7 is a main memory formed of DRAM elements or the like. 8 is a peripheral I/O bus control circuit, to which are connected peripheral I/O devices including a display control circuit 9 in connection with a display unit 10, a communication unit 11, and an external capacious storage unit 12.

The peripheral I/O control circuit 8 has its own clock generator, and the peripheral I/O devices normally operate in accordance with this clock. Another peripheral I/O device that operates fast in synchronism with the CPU 1 by being connected to the internal system bus 3 directly may be included. Indicated by 13 is a clock signal supplied to all functional blocks including the CPU 1 in connection with the internal system bus 3 so that their operations are synchronized. Alternatively, a lower-frequency clock signal may be supplied to these functional blocks excluding the CPU 1, provided that it is synchronous with the CPU clock.

Indicated by 14 is a Ready control signal produced from status signals of control circuits by a readiness control circuit 15, and it is applied to the CPU 1. 16 is a control circuit for an operator's input device 17. The operator's input device 17 is a keyboard which is controlled by a keyboard controller (KBDC) 16 in this embodiment.

Next, the operation of the system shown in FIG. 1 will be explained. The system starts up when the CPU 1 loads and runs the system program. In the normal operating mode, the operator uses the input device 17 to specify a program to be run and the CPU 1 loads the program into the main memory 7 and processes data accordingly while displaying results on the display unit 10. Depending on the program, the CPU 1 activates the communication unit 11 to send processed data to the outside, stores processed data in the external memory unit 12, or activates the file controller 4 to make access to files in the file memory 5. During these operations, the control circuits operate in synchronism with the clock signal 13 provided by the clock generator 2. When a control circuit needs to halt the CPU 1, it issues a CPU wait request signal to the readiness control circuit 15, which then negates the Ready signal 14 to the CPU 1. Consequently, the CPU 1 stays in the wait state until the Ready signal 14 is restored. The file control circuit 4 determines the time length of CPU wait state depending on the number of files accessed by the CPU 1.

Figure 2:
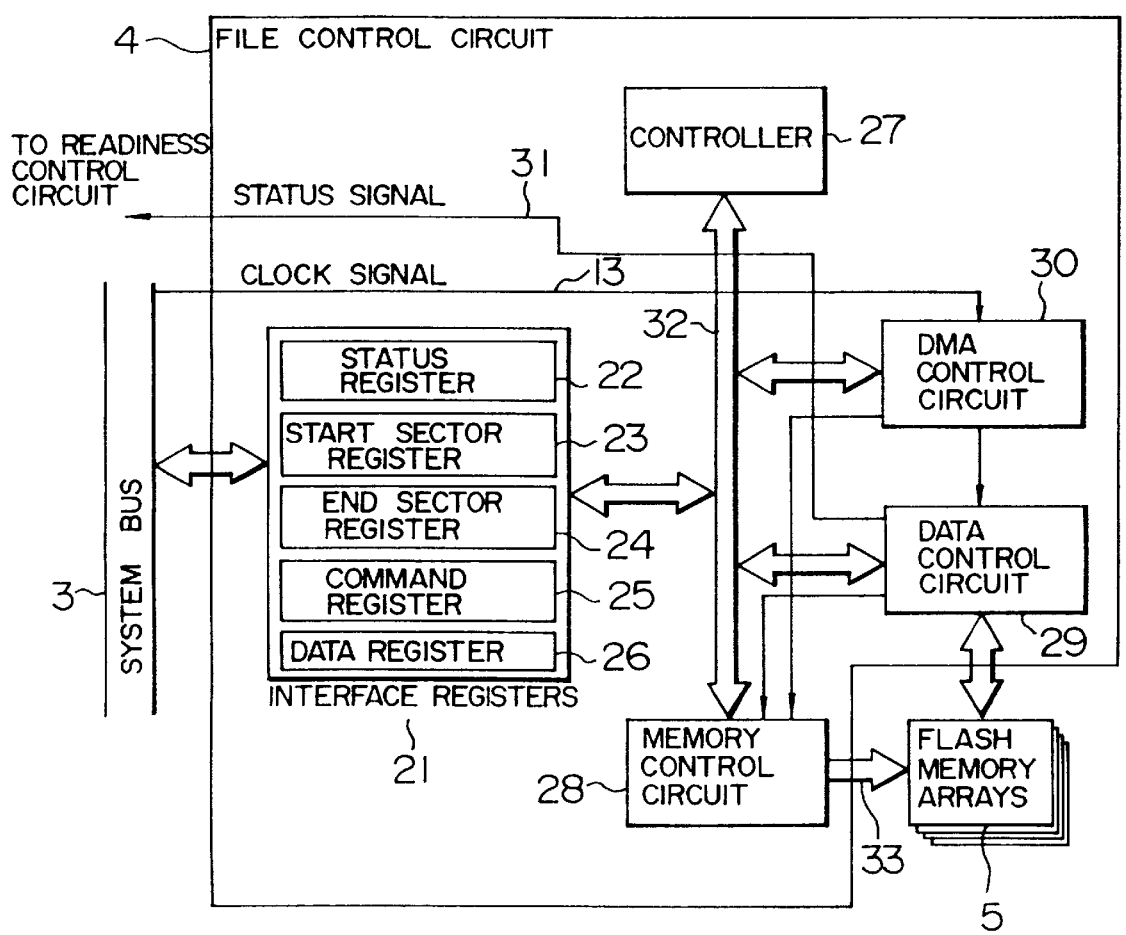
FIG. 2 is a block diagram showing the arrangement of the file memory device based on an embodiment of this invention.

The arrangement and operation for file control will be explained with reference to FIG. 2 showing the internal arrangement of the flash memory based file memory device. In the figure, items indicated by 3, 4, 5 and 13 are identical to those of FIG. 1, and the rest of items are functional blocks within the file control circuit 4.

Indicated by 21 is a set of registers for interfacing the file control circuit with the system bus, of which 22 is a status register for setting the state of the file control-circuit 4 to be indicated to the CPU, 23 is a start sector register for setting the top access sector number, 24 is an end sector register for setting the last access sector number, 25 is a command register for setting a command code of a process specified by the CPU, and 26 is a data register used to transact data with the system bus.

Indicated by 27 is a controller which controls the whole file control circuit 4, and it is preferably a programmable intelligent LSI element such as a one-chip microcomputer. 28 is a memory control circuit for controlling the flash memory arrays, 29 is a data control circuit for controlling the data read/write operation of the flash memory arrays, and 30 is a DMA control circuit for implementing the fast memory access based on the system clock signal. 31 is the status signal to be sent to the readiness control circuit, 32 is a local bus of the file memory device, and 33 is a signal bus of the access control signals and address to the flash memory arrays.

Next, the operation of the file memory device arranged as shown in FIG. 2 will be explained. The CPU 1 makes access to the file memory device through the system bus 3 by following the procedure as follows. Initially, the CPU reads the status register 22 to check the access availability of the file memory. Subsequently, the CPU specifies a sector of access by setting the start sector register 23 and end sector register 24, and sets a command code (read or write) for the access in the command code register 25. The CPU reads the status register 22 again to check the access availability, and write data or read out data in the data register 26.

During the above operation, the controller 27 reads the start sector register 23, end sector register 24 and command code register 25 to recognize the content of access to the flash memory arrays 5, and sets a code in the status register 22, thereby indicating the current state to the CPU 1.

If the controller makes a direct access to the flash memory in response to a data write or read access request from the CPU, the operational speed would be slow. Therefore, the DMA control circuit 30 is used to implement a fast flash memory access for transacting data with the system bus 3. The role of the controller 27 includes the setting for the DMA control circuit and memory control circuit depending on the content of access and the initiation of the DMA operation.

The DMA control circuit 30 generates the address and timing signals necessary for the DMA operation, and the memory control circuit 28 generates the access signal in accordance with the timing signal. The flash memory arrays 5 transact data with the data control circuit 29 in response to these signals, and the data control circuit 29 forms data depending on the number of sectors of access.

For a write access of 1-sector data for example, the data coming over the system bus 3 in one access operation is reformed to have a width equal to the number of bits of writing to a flash memory chip. In this embodiment, 32-bit data is sent over the 32-bit data bus of the system bus 3 and the flash memory chip has a 8-bit data width, and accordingly the transferred 32-bit data is written by being divided in four write operations to the flash memory array. Namely, the data control circuit 29 divides the 32-bit data into four pieces of 8-bit data by using a latch circuit.

In another case of a read access of 1-sector data, the data control circuit 29 reads a flash memory array four times and composes a piece of 32-bit data so that it is sent at once over the 32-bit data bus. During the multiple access to the flash memory array, the wait time of the system bus 3 is created by a CPU wait request caused by the status signal 31 that is generated by the data control circuit 29.

In the case of a multiple sector access, the size of data latched by the data control circuit 29 is adjusted so as to implement the fast access. For example, for a continuous read access of four sectors, four 8-bit flash memory chips are read concurrently so that 32-bit data is accessed at once. In this case, however, it is necessary for the data to have been written in the four flash memory chips concurrently so that the data is arranged uniquely for both write and read access operations, as mentioned previously. Practically, however, information processing systems generally transact data with the file memory in the form of files, i.e., the number of sectors of data that is read out is equal to that of the data at the write access, and therefore no special care is needed so far as file data is written and read out in the same access mode in terms of the number of sectors.

Specifically, at continuous writing of file data of five sectors, for example, four sectors are written in four chips in parallel and a remaining sector is stored in a chip, and the file data can be read-accessed always normally by taking the same access mode.

Similarly, continuous access of file data of six sectors is carried out as a parallel access of four sectors and a parallel access of two sectors.

Information on the data storage manner may be recorded for sector-wise data stored in the flash memory arrays 5 so as to ensure the consistency. This information can be recorded in the redundant data storage area except the data storage area if it is available, or otherwise recorded in another area provided separately.

Figure 3:
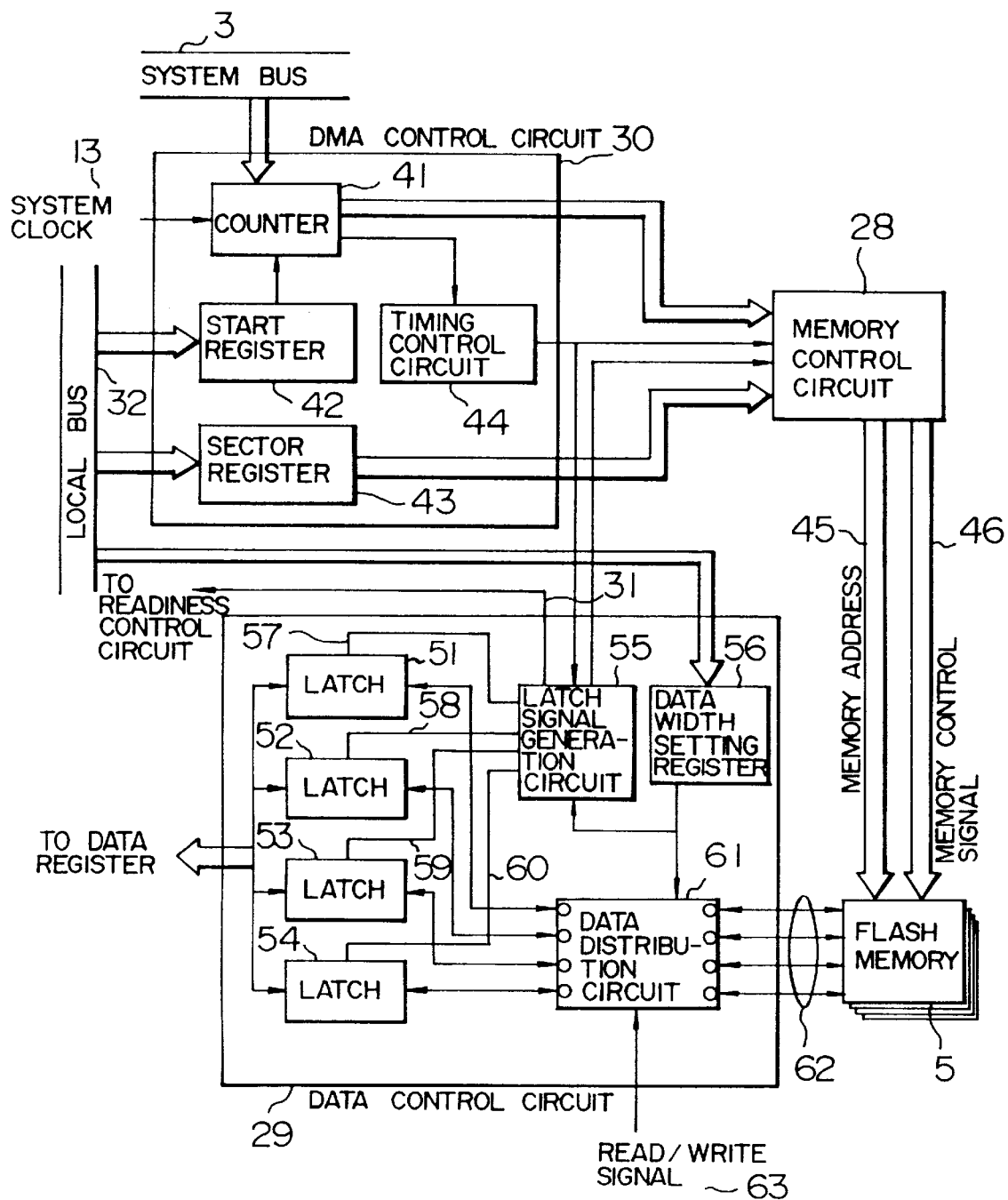
FIG. 3 is a block diagram of the principal portion of the file memory device used to explain the operation.

Next, the access signals used for data control will be explained in more detail with reference to FIG. 3. The figure shows the case of the system with a 32-bit system bus and a flash memory with a 8-bit data width. Functional blocks explained previously are referred to by the common symbols. Among new functional blocks, indicated by 41 is a counter which generates the address for the DMA control circuit 30 from the clock signal 13 and the I/O access command or memory access command on the system bus 3. 42 is a DMA start register in connection with the local bus 32 of the controller 27, and an intended DMA transfer is started by putting a certain code in this register. 43 is a sector register in connection with the local bus 32, and DMA transfer for an intended sector is carried out by putting the sector number in it. This register is practically used to generate the high-order address and chip select signal for the flash memory by delivering the set value of sector number to the memory control circuit 28. 44 is a timing control circuit for generating a timing signal used to synchronize the operations of control circuits at DMA transfer. 45 is the memory address generated by the memory control circuit 28 from the values of the counter 41 and sector register, and 46 is a set of memory control signals produced by the memory control circuit 28 by being timed to the generation of the memory address.

51, 52, 53 and 54 are 1-byte (8-bit) data latches which are combined to form a 4-byte (32-bit) data latch used for data width conversion between 32-bit data and 8-bit data within the data control circuit 29. Among data D0-14 D31 on the system bus 3, the latches 51–54 hold D0–D7, D8–D15, D16–D23 and D24–D31, respectively. 55 is a latch signal generation circuit associated with these latches. 56 is a data width setting register in connection with the local bus 32, and it is used to set the data width and data arrangement mode.

In this embodiment, one of "1", "2" and "4" is set as a number of sectors of continuous read access so that the timing of latch signal generation is indicated to the latch signal generation circuit 55. Consequently, the data latches 51–54 receive latch signals 57, 58, 59 and 60, respectively. For example, with "1" being set, the circuit 55 produces the latch signals 57–60 sequentially to produce 32-bit data on the system bus 3 through four-time accesses to a flash memory chip. With "2" being set, the circuit 55 produces a latch signal pair 57 and 58 and next another latch signal pair 59 and 60 alternately to produce 32-bit data on the system bus 3 through two-time accesses to two flash memory chips for each signal pair. With "4" being set, the circuit 55 produces the latch signals 57–60 simultaneously to produce 32-bit data on the system bus 3 through a single access to four flash memory chips.

For a write access to the file memory, the latch signals 57–60 are always fed simultaneously to all data latches 51–54 so that 32-bit data on the system bus is latched at once.

Indicated by 61 is a data distribution circuit for distributing data from the data latches to the flash memory or from the flash memory to the data latches. 62 is a data bus between the data distribution circuit and flash memory arrays, and 63 is a read/write signal supplied from the command register 25 among the interface registers 21, for example, for determining the data transfer direction of the data distribution circuit 61.

The data distribution circuit 61 is a bidirectional buffer, having one I/O ports connected to the data latches 51–54 and another I/O ports connected to the flash memory arrays 5. The I/O ports for the flash memory arrays 5 are 32 bits, which are grouped into four bit groups, i.e., bit 0 through bit 7, bit 8 through bit 15, bit 16 through bit 23 and bit 24 through bit 31, and each bit group is connected to one of four memory groups of the flash memory chips. The manner of data distribution is determined depending on the contents of the data width setting register 56.

Figure 12:
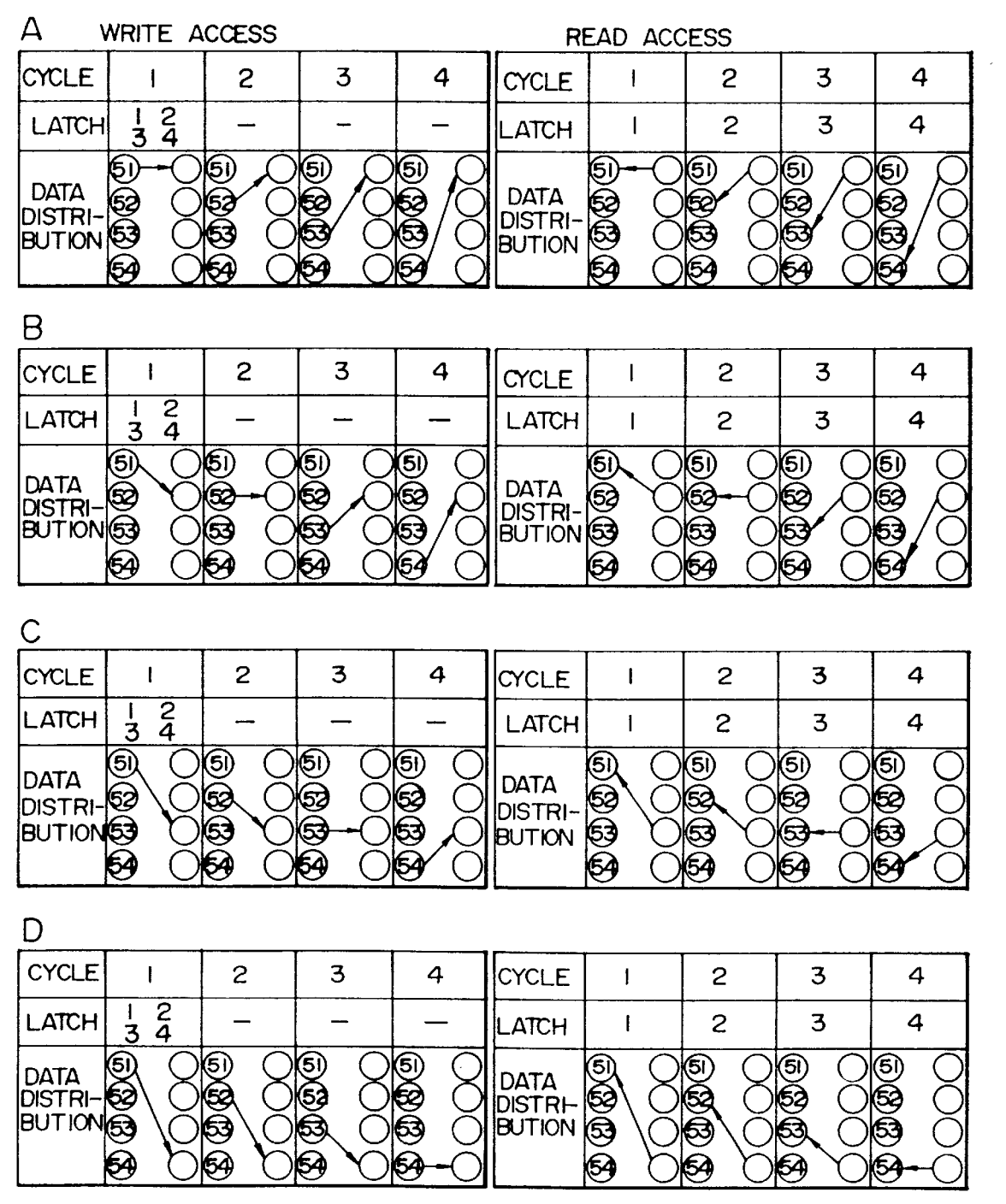
Figure 13:
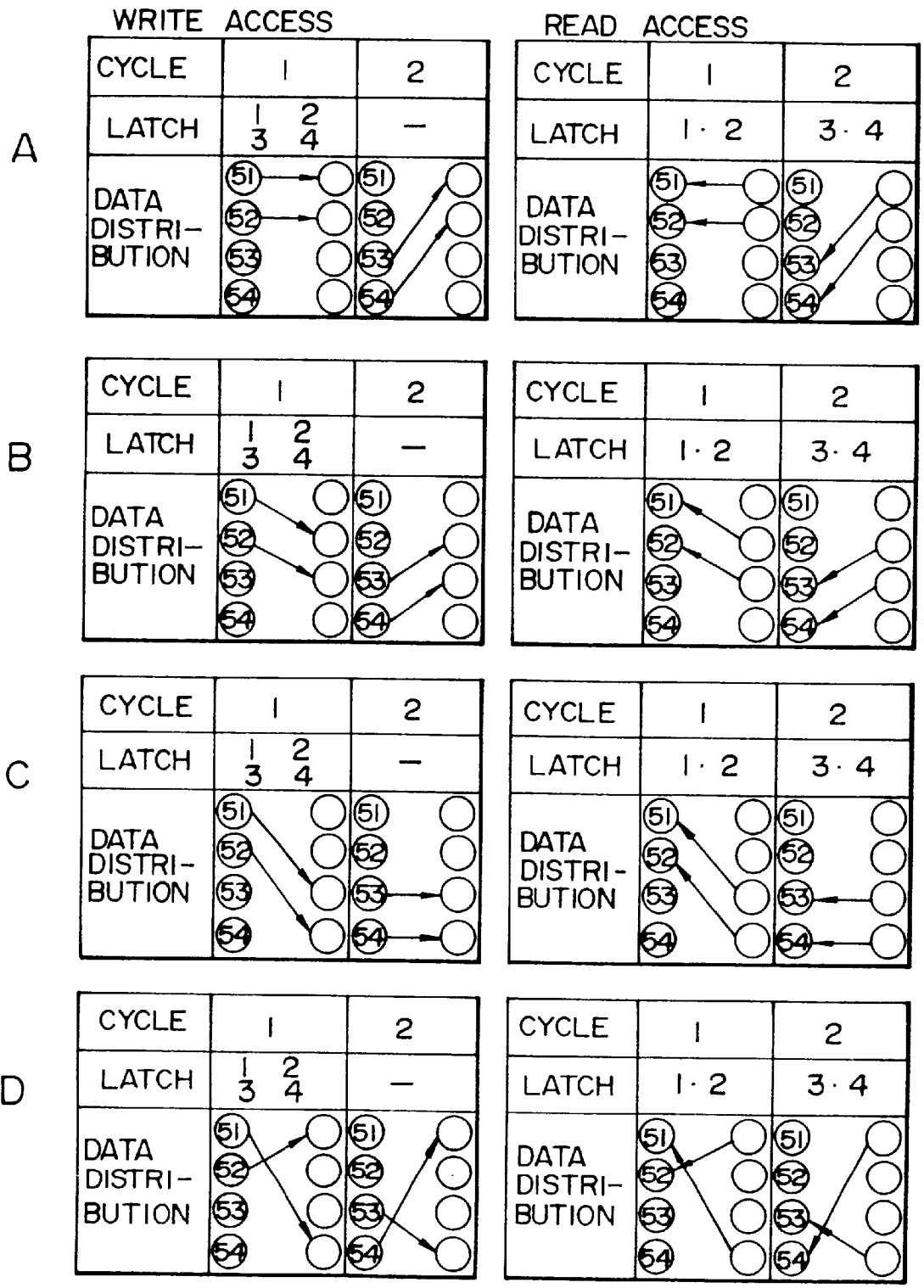
FIG. 13 is a diagram used to explain the data distribution of two memory chips concurrent access based on an embodiment of this embodiment.
Figure 14:
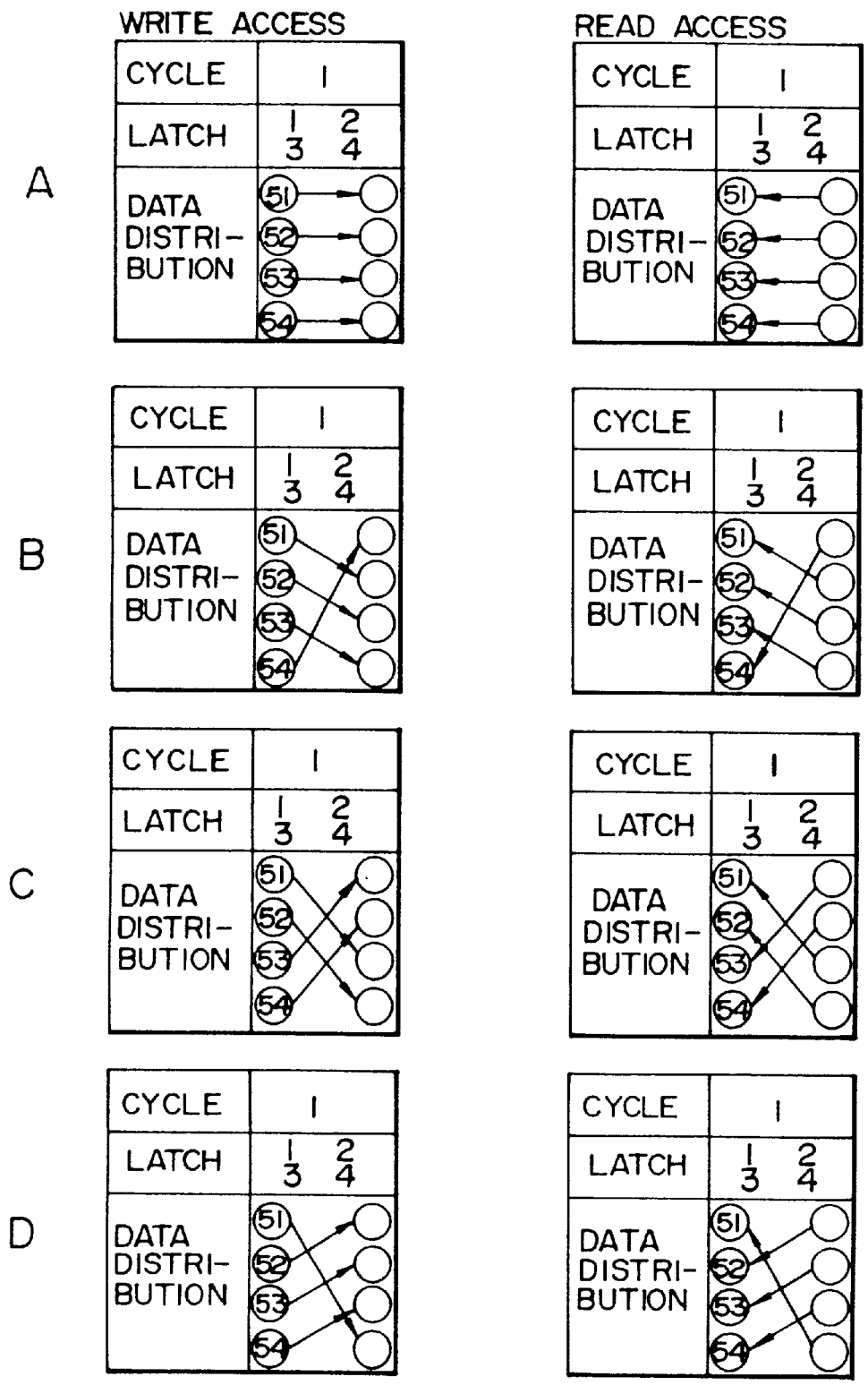
FIG. 14 is a diagram used to explain the data distribution of four memory chip concurrent access based on an embodiment of this invention.

The data distributing operation will be explained specifically with reference to FIG. 12, FIG. 13 and FIG. 14. These figures list examples of data distribution implemented by the data distribution circuit 61 in response to the setup value of the data width setting register 56. Listed in FIG. 12 is for one-sector continuous access, FIG. 13 is for two-sector continuous access and FIG. 14 is for four-sector continuous access, with each case including four kinds of data distribution depending on as to which of four memory groups is accessed. For one continuous access sector, one access operation takes four system cycles, for two continuous access sector, one access operation takes two system cycles, and for four continuous access sector, one access operation takes one system cycle.

One-sector continuous access falls into four cases depending on which ever of four memory divisions, and two-sector continuous access and four-sector continuous access also fall into four cases each depending on whichever memory group is accessed at the beginning. Accordingly, the access starting memory group can be determined properly so that all memory chips are used evenly. Although fixed designation of a certain memory group as the access starting group simplifies the data distributing logics, this group will be used most frequently and ultimately will become defective, resulting in the failure of fast write access of four continuous sectors.

Although the distribution circuit has different wiring among operation cycles for the read access of one or two continuous sectors, the latch signals are supplied only to relevant latches and therefore the wiring may be common to all cycles. For example, in the read access of one continuous sector indicated by A in FIG. 12, the data distribution cycles from memory group 1 to latch 1, from memory group 1 to latch 2, from memory group 1 to latch 3 and from memory group 1 to latch 4, but this may be altered to the wiring from memory group 1 to all latches in all cycles.

The access control will be explained more specifically. For a write access of one sector, for example, data of bit positions among the 32-bit data bus 62 in connection with a memory group is transferred from the data latch 51 in the first cycle, and similarly data from the data latches 52, 53 and 54, and again from 51, 52 and so on are transferred to corresponding memory groups in the second cycle, third cycle and fourth cycle, and again in the first cycle, second cycle and so on, as shown in FIG. 12. For a read access, data from flash memory chips are distributed into the four data latches in accordance with the latch signals in the corresponding cycles so that 32-bit data is formed.

For a write access of two sectors, i.e., writing of 2-byte data width, data of bit positions among the 32-bit data bus 62 in connection with two flash memory groups are transferred alternately from the data latches 51 and 52 in the first cycle and from the data latches 53 and 54 in the second cycle, as shown in FIG. 13. For a read access, data from two pairs of memory groups are distributed alternately to the data latches 51 and 52 in the first cycle and to 53 and 54 in the second cycle.

For a write access of four sectors, i.e., writing of 4-byte data width, the whole data on the 32-bit data bus 62 is transferred at once from the data latches 51–54 to the memory groups in connection in one cycle. For a read access, 32-bit data from the memory groups is transferred to the data latches in one cycle.

For the foregoing data transfer operations, the controller 27 sets the registers appropriately prior to the activation of the DMA control circuit 30.

Figure 5A:
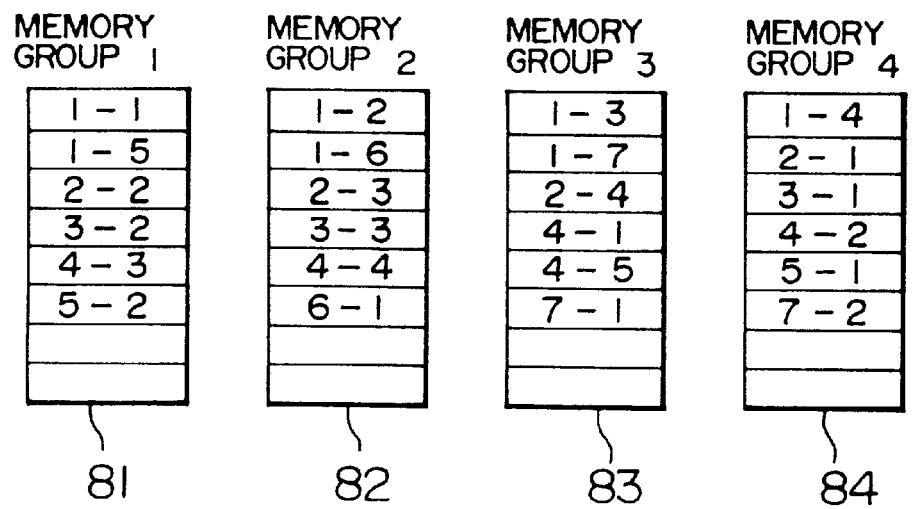
FIGS. 5A and 5B are diagrams used to explain the file storing operation based on an embodiment of this invention.
Figure 5B:
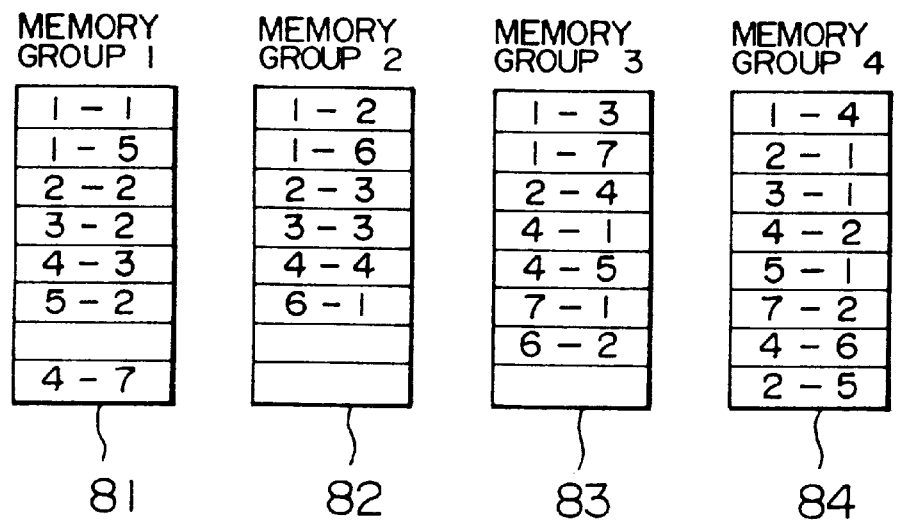

The addressing of memory groups for their simultaneous access with the intention of fast file access will be explained with reference to FIGS. 5A and 5B. These figures show first through fourth memory groups 81–84. FIG. 5A shows the memory contents after some files have been stored, and FIG. 5B shows the memory contents, with some files being revised to have increased sizes. Symbol m-n signifies a file number m and a sector number n of the file, e.g., data 3-2 is of file number 3 and sector number 2. It should be noted that the figures simply illustrate the use of individual memory areas (each area has a capacity of one sector) for each file of one sector or more, and at an actual continuous access of two sectors or more, the contents of sectors are distributed to memory areas, instead of only the contents of a single sector being stored in a 1-sector area of each memory group. This affair will be explained in more detail later in connection with the file management.

In FIG. 5A, for the access to sectors with file number 1 (all sectors symbolized by 1-n), with sectors 1-1 through 1-4 being accessed simultaneously, all memory groups are given the same address since these sectors align on the same row. In another case of the simultaneous access to sectors 2-1 through 2-4 of file number 2, the fourth memory group must be given an address different from that of other memory groups. This means that address buses equal in number to the number of memory groups are required or providing different addresses to individual memory groups is required. Although the provision of separate address buses can be avoided by taking a single access to the sector 2-1, a simultaneous access to the sectors 2-2 and 2-3 and another single access to the sector 2-4 in the above example, it retards the speed-up of file access operation.

Figure 9:
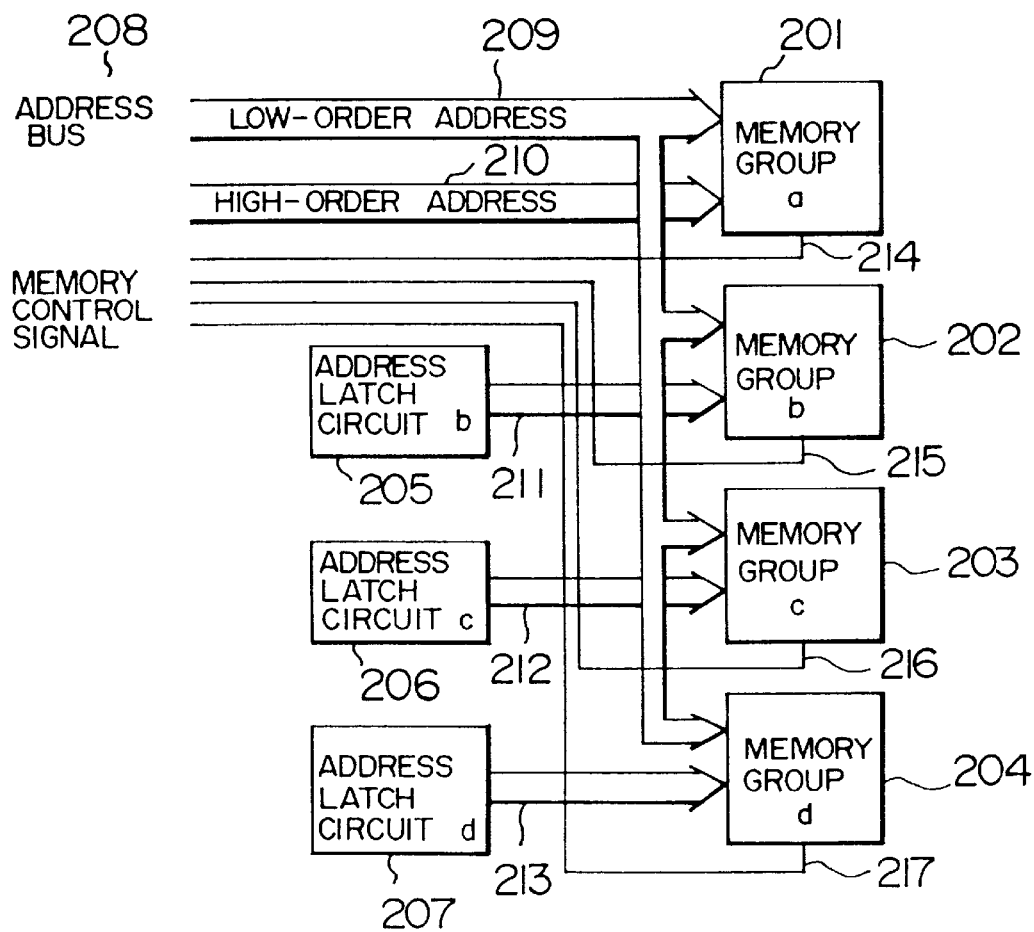
FIG. 9 is a diagram used to explain the address bus connection to the memory groups.

An alternative scheme of giving different addresses to individual memory groups will be explained on FIG. 9. The figure shows the arrangement of the address generation circuit in the memory control circuit 28 for the case of four memory groups. Indicated by 201–204 are four memory groups a, b, c and d that constitute the flash memory arrays 5. 205, 206 and 207 are latch circuits b, c and d for the high-order addresses given to the memory groups b, c and d, respectively.

Indicated by 208 is an address bus (corresponding to 45 in FIG. 3) of the memory control circuit 28, and 209 is the low-order address of the address bus 208, with the number of address bits matching the addressing to the unit erasure block of the flash memory chip or the unit area of file management. For example, the low-order address is 9 bits for a unit erasure block of 512 bytes. In case the unit erasing area of flash memory chip is smaller than the unit area of file management, the number of address bits is determined to match the file management unit area. 210 is an high-order address portion of the address bus 208 necessary for addressing the memory group.

Indicated by 211, 212 and 213 are high-order addresses held in the address latches b, c and d for addressing the memory groups b, c and d, respectively. 214, 215, 216 and 217 are memory control signals for the memory groups a, b, c and d, respectively.

For a simultaneous access to the memory groups a–d, the high-order addresses of memory groups are set in advance in the corresponding address latch circuits 205–207. At the memory access, the address bus is supplied with an address for the memory group a, with its low-order address being common to all memory groups, and the memory groups b, c and d are addressed for their high-order addresses by the respective address latch circuits. Access control is entirely carried out through the memory control signals 214–217, and for the access to only memory groups a and b for example, only the memory control signals 214 and 215 are made active. For the access to only memory group d for example, the memory group a may be given any address provided that the memory control signal 214 is inactive.

Based on this circuit arrangement, it is possible to give different addresses to individual memory groups, and data in one file that is stored in different physical address areas can be accessed at once for the enhanced file access speed through the provision of the flash memory in four divisions. An address latch circuit for the memory group a, which is absent in FIG. 9 for the sake of simplified circuit arrangement, may be provided when it is considered useful.

According to the foregoing embodiment of this invention, the CPU 1 can have a fast read/write access to intended sectors through simple settings to a relatively small number of registers. Based on a file controller formed of a one-chip microcomputer, it becomes possible to implement precise control on a software basis, and based on a DXA control circuit, fast data transfer is made possible even if the one-chip microcomputer is slower than the CPU. If the one-chip microcomputer is fast enough to follow the CPU operation, it is feasible to arrange a system in which the DMA control circuit is eliminated and the one-chip microcomputer performs the entire data transfer.

Although the foregoing embodiment is the case of a 32-bit system data bus and a 8-bit flash memory data bus, it can readily cope with other data width, such as for a 16-bit CPU, 64-bit CPU or 16-bit I/O flash memory, by altering the number of data latches, the arrangement of data width setting register and the control program of controller. FIG. 15 shows specific examples of the hardware arrangement for dealing with various combinations of system data widths and flash memory data widths. The table has columns of 4-bit, 8-bit, 16-bit and 32-bit flash memory data widths, and rows of 16-bit and 32-bit system data widths that dominate the present personal computers and 64-bit and 128-bit system data widths that are adopted by high-performance computers and will be adopted by future personal computers.

In each row of system data width, the data distribution circuit is characterized in terms of the number of bits of data distributed by one distribution circuit times the number of distribution circuits, i.e., in the figures including the data distribution circuit 61, each circle represents data distributed by one distribution circuit and the number of circles represents the number of distribution circuits. These distribution circuits are connected as shown in FIGS. 12, 13 and 14. The number of latches is selected from 1 through 4 derived from the latches 51–54 of the foregoing embodiment, and in case the memory data width is greater than the system data width, the latches are placed on the part of the data distribution circuit. The number of memory groups is derived from four divisions of the foregoing embodiment.

It should be noted that the number of distribution ports of the data distribution circuit and the number of latches and memory groups exemplified in the foregoing embodiment are the minimum requisite. The system will have an enhanced performance if the circuit scale and terminals can afford to increase these numbers. Increasing the number of memory groups expands the latitude of selection of data storage locations, preventing the uneven use of memory cells. It also increases the number of memory locations accessed in parallel, resulting in an enhanced memory access speed. In case the number of memory data bits is equal to or greater than the number of the system data width, the speed-up of memory access based on the interleaving scheme can be accomplished through the concurrent access to multiple memory chips, although the effect of data bus matching mentioned in the foregoing embodiment is lost. In this case, the number of distribution ports and latches must be increased at the same time of increasing the number of memory groups.

The foregoing embodiment is based on the assumption that the flash memory is fast enough to respond to the data transfer from the system. For this implementation the flash memory includes an internal write buffer desirably, although it will become unnecessary in the future when the flash memory will have a sufficiently fast write operation. For a flash memory without a built-in write buffer, an independent write buffer may be placed between the data control circuit and the flash memory. At a write access, data from the system is written temporarily to the write buffer and thereafter it is written to the flash memory.

Figure 4:
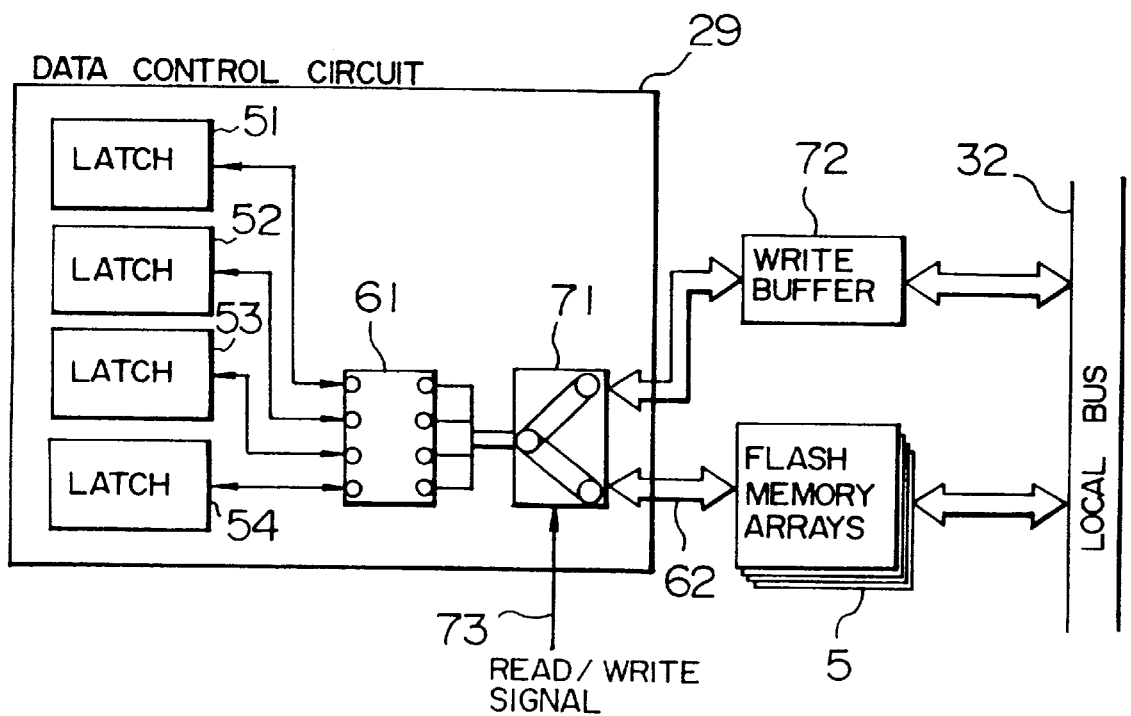
FIG. 4 is a diagram used to explain data control in the case of using memory chips of slow write ability.

FIG. 4 shows an embodiment of this arrangement, in which functional blocks explained previously are referred to by the common-symbols. Among new functional blocks, indicated by 71 is a data selector that switches the connection of the data distribution circuit 61 depending on whether the access is for reading or writing, 72 is a write buffer with the same data bus width as the CPU bus width for holding write data temporarily, and 73 is the read/write signal for operating the data selector 71 produced from the command code loaded in the command register 25.

In response to a write access, the data distribution circuit 61 is connected to the write buffer 72 so that write data from the system is held in the write buffer 72, and thereafter it is written to the flash memory arrays 5 by the controller. In response to a read access, the data distribution circuit 61 is connected directly to the flash memory arrays 5, and the same operation of read access explained on FIG. 3 takes place. Based on this arrangement, it becomes possible for the system to have a fast flash memory access even if a flash memory of slow write operation without a built-in write buffer is used.

Next, an embodiment of the file management, i.e., a software-based operation for storing file data in the flash memory, will be explained by using the example shown in FIGS. 5A and 5B. This operation is basically carried out by the CPU, the system program and the controller of flash memory. FIGS. 5A and 5B show the assignment of unit areas (one sector) of each memory group to sectors of files as a result of the soft ware-based file storing operation. For a file of four or more continuous sectors, four sectors (e.g., 1-1 through 1-4 as shown) are given a sequential assignment of unit areas of the first through fourth memory groups. These sector data are actually stored by being distributed to four unit areas. Two sectors (e.g., 1-5 and 1-6 as shown) are given a distributed assignment of unit areas of two memory groups. A remaining sector (e.g., 1-7) is given a unit area of one memory group.

The distributive storing operation for two sectors and four sectors will be explained in more detail with reference to FIG. 10 and FIG. 11 showing examples of 4-byte and 2-byte simultaneous write operations, respectively. The system has a 32-bit data bus and each memory group has a 8-bit data access width as in the preceding embodiment.

FIG. 10 shows the case of 4-sector concurrent writing to four memory groups a, b, c and d. Indicated by 221 are 32-bit (4-byte) data coming over the system bus, 222–225 are serial numbers of 8-bit (1-byte) data, and 222, 223, 224 and 225 are first, second, third and fourth byte data, respectively. Data of the first through 2048th bytes of four sectors are sent continuously in such a manner that the first through fourth bytes are sent concurrently at the beginning over the 32-bit bus. Indicated by 51–54 are data latches shown in FIG. 3 for holding data temporarily.

After 32-bit (4-byte) data has been held in the data latches 51–54 at once, individual byte data are written by being distributed in the four memory groups a through d. Subsequently, the next 32-bit data is written additionally in the memory groups a through d. In this manner, the first through 512th bytes of the first sector are written in the memory groups, and the next 512-byte data of the second sector are written additionally in the memory groups, four bytes at a time. Although FIGS. 5A and 5B show the assignment of specific memory groups to individual sectors, data of each sector is actually written by being distributed to the memory groups a–d. As a special case, 4-sector data are stored in a 4-sector area provided by the memory groups a, b, c and d.

FIG. 11 shows 2-byte concurrent writing to the memory groups a and b. After the 32-bit (4-byte) data has been held in the data latches 51–54 at once, the latched data is divided into two parts. The first 2-byte data is written in the memory groups a and b, and subsequently the second 2-byte data is written additionally in the memory groups a and b. In this manner, 512-byte data of the first sector are written in the memory groups a and b, and subsequently 512-byte data of the second sector are written additionally in the memory groups a and b. Also in this case, the first sector is written by being distributed to the memory groups a and b, instead of being stored in a particular memory group, and the second sector is distributed to the memory groups a and b in the same manner.

In the case of the write operation of one sector (not shown), byte data of the data latches 51–54 are stored in a certain memory group. In this case only, the 1-sector data is stored in a particular memory group without being distributed.

As a result of the data write access operation, data of different files are not mixed in a unit erasure block (one sector of 512 bytes in this example). Consequently, it becomes possible to avoid the unintentional erasure of other files at the revision of one file and write multiple bytes of data concurrently while using the memory areas effectively, and a fast file data storing operation is accomplished.

As mentioned previously, FIG. 5A shows the memory contents after some files have been stored, and FIG. 5B shows the memory contents, with some files being revised to have increased sizes. In FIG. 5A, files are initially stored closely in the ascending order of the file number, with a memory group being assigned to each sector number sequentially and cyclically.

In this manner of storing file sectors closely and sequentially so that the memory groups have no vacant sector, as shown in FIG. 5A, if a file has an increased size due to revision, it could not be stored in physically continuous locations as shown in FIG. 5B. Even in such a case, file sectors are stored such that the assigned memory groups are continuous. For example, a file with file number 4 made up of five sectors 4-1 through 4-5 is initially stored as shown in FIG. 5A, and the file has additional two sectors 4-6 and 4-7 in FIG. 5B. Since the file starts with its top sector 4-1 at the memory group 3, the additional sectors 4-6 and 4-7 have their areas reserved in the memory groups 2 and 3. At the writing of the file having the increased sectors, the sectors 4-5 and 4-6 are treated as two continuous sectors and the sector 4-7 is treated as a single sector. Namely, additional sectors are treated to be continuous to the existing sectors.

For the smooth storing and reading of files, the file management system may be designed such that the system specifies access sectors by setting a starting sector and the number of sectors on a hardware basis, and the file system controls their physical storage locations. In this case, the end sector register 24 shown in FIG. 2 is unnecessary. Information for chaining file sectors is stored in a redundant area of the memory, if it exists, or otherwise in a separate memory means so that once the file starting sector number is specified, physical storage locations of the successive sectors can be traced for the continuous sector access.

Figure 6:
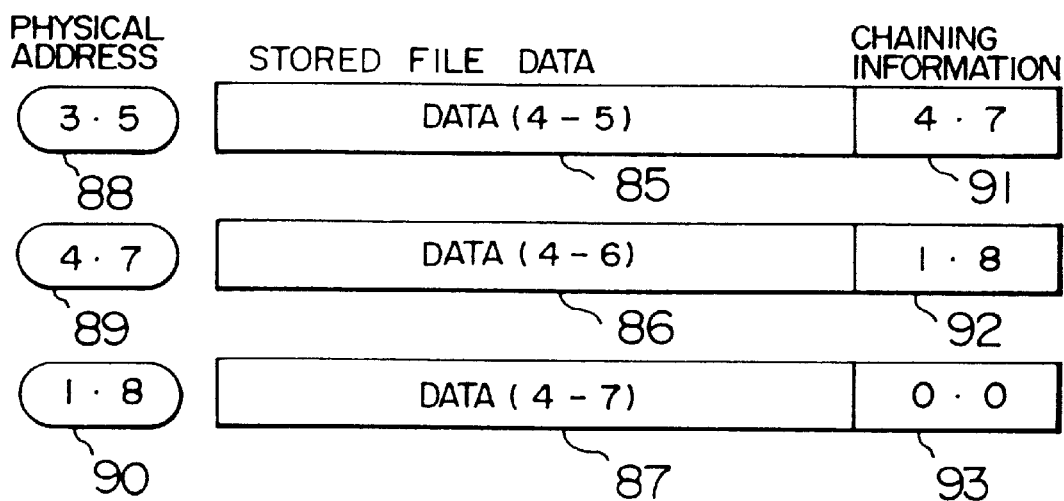
FIG. 6 is a diagram used to explain the daisy-chain data storing operation based on another embodiment of this invention.

FIG. 6 shows an example of the chaining information. Indicated by 85 is stored file data having file number 4 and sector number 5. 86 is file data of the next sector having file number 4 and sector number 6, and 87 is file data of the next sector having file number 4 and sector number 7. Although the data sectors of this example have sequential sector numbers, data may be stored by being scrambled through the concurrent access to multiple memory chips. Even in such a case, the sector number has a crucial role for storing byte-wise data in order.

Indicated by 88 is the physical address of the file data 85, with its left-hand numeral "3" indicating the memory group number and its right-hand numeral "5" indicating the address within the memory group. Similarly, 89 and 90 are physical addresses of the stored file data 86 and 87. 91 is chaining information that points the physical address of the next sector of the file data 85, i.e., the physical address of the file data 86 in this case, with its left-hand numeral indicating the memory group number and its right-hand numeral indicating the address within the memory group. Similarly, chaining information 92 indicates the physical address of the file data 87. Chaining information 93 has its content indicating the absence of a successive sector, i.e., this is the last sector of the file of file number 4.

With the chaining information being appended to stored file data, the CPU of the system does not need to recognize the physical location of a file in order to access to it, but the file controller makes reference to the chaining information to reach the physical location in the memory. Consequently, it becomes possible to make a continuous access to a file even if it is not stored in continuous locations. For this operation, means of entering multiple addresses for the concurrent access to multiple memory groups is necessary. Low-order address for 1-sector access is used commonly, as explained on FIG. 9, and therefore it is required only for the high-order address portion. According to this embodiment using the chaining information, addressing of files from the system is simplified, and it can be carried out by dealing with a small amount of information.

Figure 7:
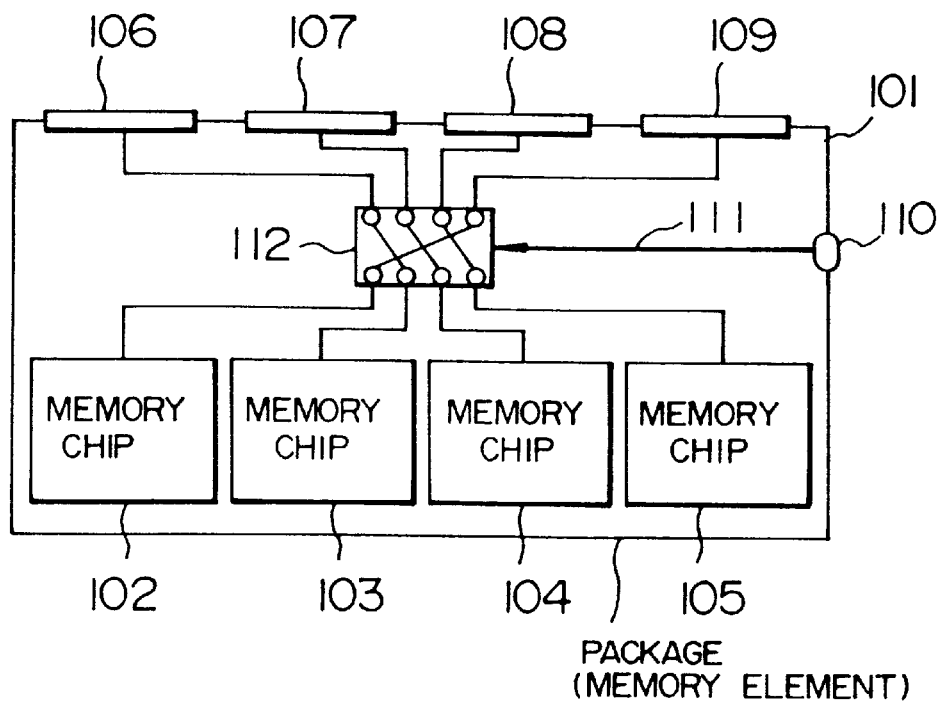
FIG. 7 is a diagram used to explain the memory package with the built-in data distribution function that bases the operation on an input specification signal.

Next, an embodiment of building the file access functions within a memory element will be explained. FIG. 7 shows the arrangement of a memory element including multiple memory chips and associated circuitry packaged in a single case. In the figure, indicated by 101 is a memory element, 102–105 are memory chips of the same structure, and 106–109 are input/output data terminals of the element each used for the data input/output of one memory chip. For memory chips of 8-bit data width, for example, the memory element has 32-bit data input/output terminals consisting of the four 8-bit data input/output terminals 106–109. 110 is an input terminal of a signal 111 that is provided by the user for specifying the connection between the memory chips and data input/output terminals, and 112 is a data connection circuit.

The data connection is selected based on the data distribution in the data control circuit explained previously on FIG. 12 through FIG. 14, for example. In the memory element 101, the received connection setting signal 111 is fed to the data connection circuit 112, which then connects the memory chips 102–105 to the data input/output terminals 106–109 accordingly so that data is transferred between the memory chips and the external data bus.

Figure 8:
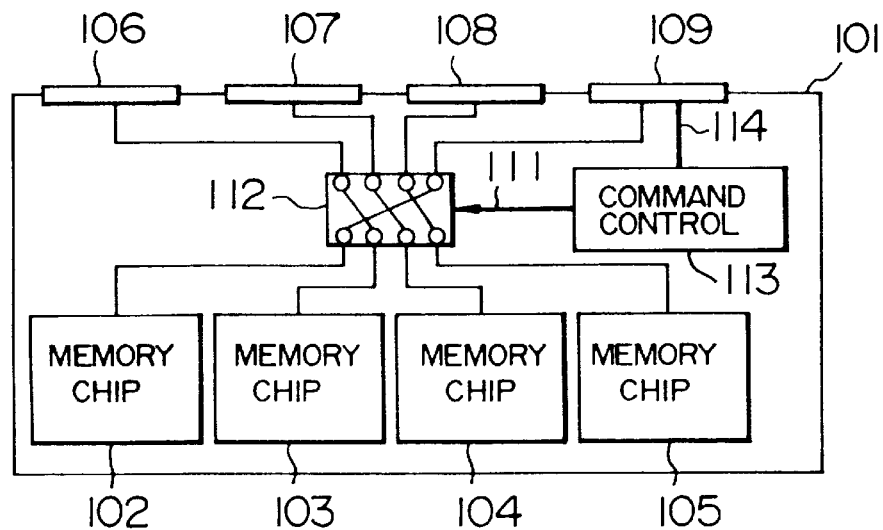
FIG. 8 is a diagram used to explain the memory package with the built-in data distribution function that bases the operation on the setting of a command.

FIG. 8 shows the arrangement of a memory element which is designed to set the data connection between the memory chips and input/output terminals based on the command entered by the user. In the figure, indicated by 113 is a command control circuit including a command setting register for producing the data connection setting signal 111 based on the setup value, and 114 is a set of data lines for feeding a command value, which is received on a data input/output terminal, to the command control circuit 113. Remaining portions of the arrangement are identical to FIG. 7. The user selects an internal data connection by making reference to FIG. 12 through FIG. 14, and enters the respective command code to the command control circuit 113 through the data lines 114. The command control circuit 113 produces a data connection setting signal 111 in accordance with the command code and applies it to the data connection circuit 112. The subsequent operation is identical to the arrangement of FIG. 7.

The memory elements based on these embodiments explained on FIG. 7 and FIG. 8 are effective for the simplification of the peripheral circuitry of the file memory device. Although in the foregoing embodiments, memory chips and associated control circuits are packaged in a memory package, integrating these components within a single chip will further enhance the compactness and fast memory access performance.

What is claimed is:

1. A storage apparatus to be coupled with a system bus for receiving a write request accompanied with a plurality of sector data through said system bus from an information processing system, wherein each of said plurality of sector data is comprised of 512 bytes, comprising:

an interface unit to be coupled to said system bus;

a plurality of nonvolatile flash semiconductor memories each of which includes a plurality of memory blocks of erase units erasable by flash erase operations; and a controller, coupled to said interface unit and said plurality of nonvolatile flash semiconductor memories, which carries out write operations of said plurality of sector data into said plurality of nonvolatile flash semiconductor memories in response to said write request, wherein each of said plurality of nonvolatile flash semiconductor memories has a flash data bus width of a first predetermined bit number for inputting data to be written into each nonvolatile flash semiconductor memory, wherein said interface unit has a system data bus width of a second predetermined bit number which includes a product number of multiplying said first predetermined bit number by a number of said plurality of nonvolatile flash semiconductor memories, and wherein said write operations of said plurality of sector data into said plurality of nonvolatile flash semiconductor memories are carried out simultaneously in response to said write request.

2. A storage apparatus according to claim 1, wherein each of said plurality of nonvolatile flash semiconductor memories is a flash memory chip.

3. A storage apparatus according to claim 1, wherein said controller includes a processor.

4. A storage apparatus according to claim 1, wherein a number of the simultaneous write operations of said plurality of sector data into said plurality of nonvolatile flash semiconductor memories is dependent on a number of sectors of said plurality of sector data to be written in response to said write request.

5. A storage apparatus according to claim 1, wherein a size of each of said plurality of memory blocks of erase units is 512 bytes.

6. A storage apparatus to be coupled with a system bus for receiving a write request accompanied with a plurality of sector data through said system bus from an information processing system, wherein each of said plurality of sector data is comprised of 512 bytes, comprising:

an interface unit to be coupled to said system bus;

a plurality of nonvolatile flash semiconductor memories each of which includes a plurality of memory blocks of erase units erasable by flash erase operations; and a controller, coupled to said interface unit and said plurality of nonvolatile flash semiconductor memories, which carries out write operations of said plurality of sector data into said plurality of nonvolatile flash semiconductor memories in response to said write request, wherein each of said plurality of nonvolatile flash semiconductor memories has a flash data bus width of a first predetermined bit number for inputting data to be written into each nonvolatile flash semiconductor memory, wherein said interface unit has a system data bus width of a second predetermined bit number which includes a product number of multiplying said first predetermined bit number by a number of said plurality of nonvolatile flash semiconductor memories, and wherein said write operations of said plurality of sector data into said plurality of nonvolatile flash semiconductor memories are carried out in parallel in response to said write request.

7. A storage apparatus according to claim 6, wherein each of said plurality of nonvolatile flash semiconductor memories is a flash memory chip.

8. A storage apparatus according to claim 6, wherein said controller includes a processor.

9. A storage apparatus according to claim 6, wherein a number of the parallel write operations of said plurality of sector data into said plurality of nonvolatile flash semiconductor memories is dependent on a number of sectors of said plurality of sector data to be written in response to said write request.

10. A storage apparatus according to claim 6, wherein a size of each of said plurality of memory blocks of erase units is 512 bytes.

11. A storage apparatus to be coupled with a system bus for receiving a write request accompanied with a plurality of sector data through said system bus from an information processing system, wherein each of said plurality of sector data is comprised of 512 bytes, comprising:

an interface unit to be coupled to said system bus;

a plurality of nonvolatile flash semiconductor memories each of which includes a plurality of memory blocks of erase units erasable by flash erase operations; and a controller, coupled with said interface unit and said plurality of nonvolatile flash semiconductor memories, which carries out write operations of said plurality of sector data into said plurality of nonvolatile flash semiconductor memories in response to said write request, wherein each of said plurality of nonvolatile flash semiconductor memories has a flash data bus width of a first predetermined bit number for inputting data to be written into each nonvolatile flash semiconductor memory, wherein said interface unit has a system data bus width of a second predetermined bit number which includes a product number of multiplying said first predetermined bit number by a number of said plurality of nonvolatile flash semiconductor memories, and wherein said write operations of said plurality of sector data into said plurality of nonvolatile flash semiconductor memories are carried out concurrently in response to said write request.

12. A storage apparatus according to claim 11, wherein each of said plurality of nonvolatile flash semiconductor memories is a flash memory chip.

13. A storage apparatus according to claim 11, wherein said controller includes a processor.

14. A storage apparatus according to claim 11, wherein a number of the concurrent write operations of said plurality of sector data into said plurality of nonvolatile flash semiconductor memories is dependent on a number of sectors of said plurality of sector data to be written in response to said write request.

15. A storage apparatus according to claim 11, wherein a size of each of said plurality of memory blocks of erase units is 512 bytes.

* * * * *